United States Patent [19]

Schmidt et al.

[11] Patent Number: 5,252,389
[45] Date of Patent: Oct. 12, 1993

[54] BIAXIALLY STRETCHED POLYPROPYLENE MONOFILM

[75] Inventors: Robert Schmidt, Walluf; Peter Eiden, Bad Homburg; Gerhard Koch, Mandelbachtal; Karl-Heinz Mueller, Schiffweiler, all of Fed. Rep. of Germany

[73] Assignee: Hoechst Aktiengesellschaft, Frankfurt am Main, Fed. Rep. of Germany

[21] Appl. No.: 824,230

[22] Filed: Jan. 22, 1992

[30] Foreign Application Priority Data

Jan. 22, 1991 [DE] Fed. Rep. of Germany ....... 4101650

[51] Int. Cl.⁵ ............................................... B32B 7/02
[52] U.S. Cl. .................................... 428/334; 428/461; 428/409; 428/379; 428/516; 361/323; 264/290.2; 154/229
[58] Field of Search ............... 428/500, 516, 461, 334, 428/409, 379; 264/290.2; 156/229; 361/233

[56] References Cited

U.S. PATENT DOCUMENTS 4,803,027 2/1989 Peiffer et al. ..................... 264/210.5

FOREIGN PATENT DOCUMENTS 3231013 3/1983 Fed. Rep. of Germany .
3620219 12/1987 Fed. Rep. of Germany .

Primary Examiner—Edith Buffalow
Attorney, Agent, or Firm—Foley & Lardner

[57] ABSTRACT

A biaxially stretched polypropylene monofilm, wherein the surfaces of the two sides of the polypropylene monofilm have different roughnesses $R_Z$, is employed as an insulation film for the production of capacitors. The smoother of the two surfaces of the polypropylene monofilm is substantially free from fibrils and pits, so that no flaws occur in a metal layer applied on metallization of this surface.

21 Claims, 2 Drawing Sheets

BIAXIALLY STRETCHED POLYPROPYLENE MONOFILM

BACKGROUND OF THE INVENTION

The invention relates to a biaxially stretched polypropylene monofilm made from pure polypropylene and having an ash content of less than 50 ppm. Polypropylene monofilms of this type have surfaces of the same or comparable roughness.

Polypropylene films for use as electrical insulation films must have a multiplicity of electrical, mechanical, and surface properties. Examples of desired electrical properties include a low dielectric loss factor ($\hat{=}$ tan $\delta$), high electrical volume resistance, high d.c. and a.c. voltage strength, and the lowest possible number of flaws.

Furthermore, electrical insulation films are required to have high strength in the longitudinal direction and low shrinkage. In addition, in films, in particular for use in metallization, for example for metallized polypropylene film dielectric capacitors, there is a requirement for a smooth surface, which is metallized, and a rough surface, which is necessary for processing reasons in order to avoid blocking of the film coil. The requirement for a smooth side of the film results from the desire to achieve the most flaw-free metallization possible, which ensures a long service life of a capacitor produced from the metallized film.

This essential product property of capacitors made from metallized polypropylene films, in particular in the case of metallization using aluminum, is determined by measuring the drop in capacity over a time span of from about 1000 to 2000 hours under defined load, level of the applied alternating voltage, and frequency. A long service life means a low drop in capacity.

The drop in capacity results from oxidation processes on the vapor-deposited metal layer. These oxidation processes cause nonconductive aluminum oxide, $Al_2O_3$, to form in the case of films vapordeposited with aluminum. These oxidized, nonconductive areas of the aluminum layer grow with time and reduce the active capacitor surface area and thus the capacity of the capacitor. The mechanisms responsible for the corrosion are of an electrochemical nature. Thus, "On the mechanism of aluminum corrosion in metallized film AC capacitors", IEEE Transactions on Electrical Insulation, Volume E1-19, No. 4, August 1984, author D.F. Taylor, describes that complete removal of moisture causes cessation of corrosion, but such removal is impossible in practice. On the other hand, corrosion increases with temperature, applied alternating voltage, and frequency. A directcurrent field, which is equivalent to the peak value of the alternating-current field, can neither initiate nor support the corrosion process.

These observations are consistent with the mechanism of anodic oxidation at the edge of flaws in aluminum coatings of metallized electrical insulation films. These discontinuities in the aluminum layer must be sufficiently large to reinforce the local electrical field and to maintain ion transport into the oxide site. Fibrils and pits on the polymer surface and both electrical and electrochemical self-healing processes are the most probable sources of corrosion which initiate defects in the metal coating. As is known, the drop in capacity increases with the roughness of the surface of the side of the film to be metallized.

A further known problem in the further processing of polypropylene films having very smooth surfaces is that the films tend to block during cutting and winding. In particular during further processing on high-speed capacitor winding machines, such films with smooth surfaces on both sides cannot be employed. For this reason, polypropylene electrical insulation films are required to have adequate roughness on one side, which ensures that sufficient air is present between two successive layers of a film coil to prevent blocking of the film and thus to ensure good processing properties.

DE-A 28 51 557 discloses a biaxially stretched polypropylene composite film which comprises two layers of different composition, one surface having a maximum roughness $R_Z$ of 0.15 $\mu$m, while the other surface of the film composite has a $R_Z$ value of between 0.2 $\mu$m and 0.4 $\mu$m. The modulus of elasticity of this composite film in all directions of the film plane is greater than 2000 N/mm². The film composite has a d.c. voltage strength of 690 V/$\mu$m.

A film composite of this type is used as an electrical insulation film for the production of metallized polypropylene film dielectric capacitors, a certain roughness being absolutely necessary on one side for processing reasons, while the other side of the film composite is smooth. In order to achieve the different roughness, the layer on the smooth side of the film composite comprises pure polypropylene and the other, rough side, comprises a polymer mixture or a block copolymer. A film composite of this type exhibits a low drop in capacity. In addition to increased costs for raw materials and production, due to the melt coating or coextrusion of the two layers, the technological problem arises that partial metal delamination can occur on further processing of the film composite in the case of this known film composite.

DE-A 27 40 237 describes a production process for a polypropylene film having rough surfaces in which the roughness is produced by setting certain crystallization temperatures and cooling periods as desired. DE-A 25 53 693 discloses a process for the production of rough polypropylene films in which a fibril-like network structure is achieved on the surface by means of certain stretching temperatures and ratios. This network structure ensures better absorption of the insulation oils used in the production of capacitors.

A similar process for the production of rough electrical insulation films is disclosed in DE-A 27 22 087. Here, specific stretching conditions and temperatures cause crystals in the $\beta$-form, having a mean diameter of more than 7 $\mu$m, to be produced in the surface, with a distribution density of the crystals of greater than 5000 g/cm² in the case of spherulites or greater than 1000 g/cm² in the case of rod-like crystals. DE-A 26 01 810 describes a certain temperature program for roughening tubular films, giving spherulites of the $\gamma$-type.

Due to the steep characteristic line of the crystallization kinetics, the known processes have the problem that the observance of very specific process conditions is extremely difficult technically and is very susceptible to faults due to external influences, such as, for example, air convection. The resultant films are primarily designed for absorption of insulation oils employed in the production of capacitors, but less for the electrical properties as electrical insulation films.

It is known that the electrical properties of biaxially stretched polypropylene films are highly dependent on their surface structure. The ideal electrical properties are observed on the one hand in polypropylene films having very smooth and planeparallel surfaces, but on the other hand the problem outlined above of blocking of the film during further processing occurs. The good electrical properties of polypropylene films diminish with increasing roughness of the surface. In particular the service life test, in which the drop in capacity of a capacitor is measured as a function of time, indicates a clear dependence on the surface roughness.

Vapor-deposition of the polypropylene films with a rough surface gives a non-constant layer thickness since the metal layer is thinner at the edges of a fibril or bump than at the flat areas of the film.

SUMMARY OF THE INVENTION

Thus, an object of the present invention is to provide a biaxially stretched polypropylene monofilm in the form of an electrical insulation film for the production of capacitors, which on the one hand does not block during further processing, and on the other hand is not susceptible to corrosion and thus has only low drops in capacity.

In accomplishing the foregoing objectives there has been provided, a biaxially stretched polypropylene monofilm having two surfaces, wherein the two surfaces have different roughnesses.

There has also been provided a biaxially stretched polypropylene monofilm, wherein one surface of the monofilms comprises both beta and alpha spherulite crystal-structure phases, and the other surface comprises substantially no beta-spherulite phases.

BRIEF DESCRIPTION OF THE DRAWINGS

The invention is described in greater detail below with reference to the drawings, in which.

DETAILED DESCRIPTION OF THE PREFERRED EMBODIMENTS

In an embodiment of the invention, the mean roughness $R_Z$ of the smoother surface is less than or equal to 0.25 $\mu$m, and the mean roughness $R_Z$ of the rougher surface is at least 0.020 $\mu$m higher, in each case measured at a cut-off value of 0.08 mm for the roughness measurement.

Figure 1:
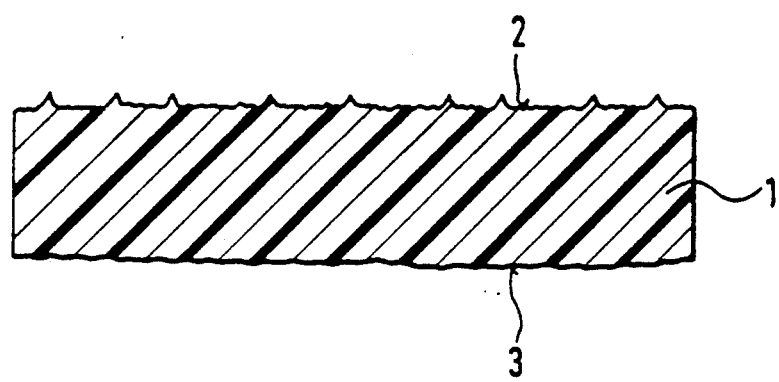
FIG. 1 shows a section view through a monofilm of the invention having a smooth surface and a rough surface.

The section representation of FIG. 1 shows a monofilm 1 with the two surfaces 2 and 3, which have different roughnesses. By monofilm is meant a film comprising only a single film layer, i.e., not a composite film such as described in DE-A-28 51 557. The surface 2 is significantly rougher than the surface 3. The texture of the surfaces is achieved by pretreatment of the prefilm, which is formed into the final film by biaxial stretching.

The monofilm can be produced by any process which will give the desired film characteristic. A preferred process will now be described. Before undergoing the longitudinal stretching, the extruded prefilm passes through a heated-air zone, in which gentle warming, with avoidance of overheating, of the two sides of the prefilm is carried out. The slow cooling of the melt film, which exits a flatfilm die at a temperature of about 230° C., and is fed directly to a chill roll at a temperature of about 90° C., causes two phases of the crystal structure to form in the prefilm, namely a phase containing α-spherulites and a phase containing β-spherulites.

On passing through the preheating zone, the temperature of the prefilm is preferably kept in the range from about 125° C. to about 141° C., i.e., just below the temperature at which conversion of the β-spherulites into α-spherulites takes place. The residence time of the prefilm in the preheating zone is preferably between 2 and 20 seconds.

The prefilm then passes into the stretching zones, in which it is biaxially stretched. The feed roll of the longitudinal stretching zone preferably has a temperature of $\geq$ about 150° C., so that the β-spherulites in the surface of the side of the prefilm in contact with the roll undergo phase transition and are converted into α-spherulites, while the opposite surface of the prefilm, which is not in contact with the feed roll of the longitudinal stretching zone also retains the crystal structure of α-spherulites, whereby the β-spherulites have been converted into α-spherulites by mechanical collapsing during the longitudinal stretching. The transverse stretching is carried out in the conventional temperature range, preferably between about 150° and about 165° C.

The smoother surface of the resultant monofilm preferably has a mean roughness $R_Z$ of less than or equal to about 0.25 $\mu$m, while the rougher surface preferably has a mean roughness $R_Z$ at least about 0.02 $\mu$m higher. During the roughness measurements, the cut-off value of the measurement is set at 0.08 mm.

The material of the monofilm is high-purity, clean polypropylene whose ash content is preferably less than about 50 ppm. The polypropylenes used to produce the films are preferably free from inorganic or organic lubricants and preferably contain no ionogenic constituents. The polypropylene is preferably a homopolymer of propylene. The monofilm preferably contains the homopolymer as the only polymer in the film and the monofilm preferably contains no other additives but for the optional use of stabilizers discussed hereinafter. The film may, however, also contain other additives, such as poly4-methylpentene-1, in amounts of up to a maximum of 10% by weight.

The thickness of the polypropylene monofilm is preferably from about 3 to 20 $\mu$m, more preferably about 4 to about 15 $\mu$m.

The mean roughness $R_Z$ is the arithmetic mean of 5 individual measurements of the roughness $R_Z$, where $R_Z$ indicates the value between the maximum and the minimum of the roughness within an individual measurement zone corresponding to the cut-off value.

The modulus of elasticity of the biaxially stretched polypropylene monofilm is preferably from about 2200 to about 3000 N/mm$^2$ in the longitudinal direction and from about 4200 to about 5200 N/mm$^2$ in the transverse direction. The specific volume resistance at 23° C. is preferably from about $1 \times 10^{18}$ to about $1 \times 10^{19} \Omega$cm.

Figure 2:
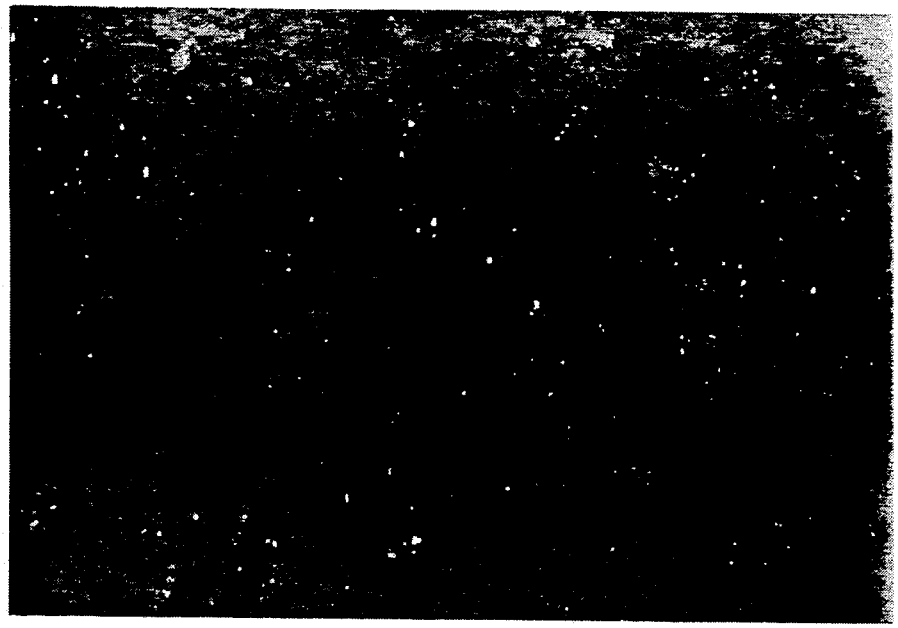
FIG. 2 shows a plan view of the smooth surface, to be metallized, of a monofilm of the invention.

FIG. 2 shows a plan view of a polypropylene monofilm of the invention. During production of this 8 $\mu$m thick biaxially stretched polypropylene monofilm, the prefilm is warmed to a temperature of 132° C. before the longitudinal stretching and remains at this temperature for 6 seconds in the preheating zone. The temperature of the feed roll of the stretching zone is 152° C. The smoother surface, to be metallized, of the polypropylene monofilm exhibits neither pits nor fibrils, so that no flaws are present, which might impair the formation of a uniform metal layer by vapor deposition.

Figure 3:
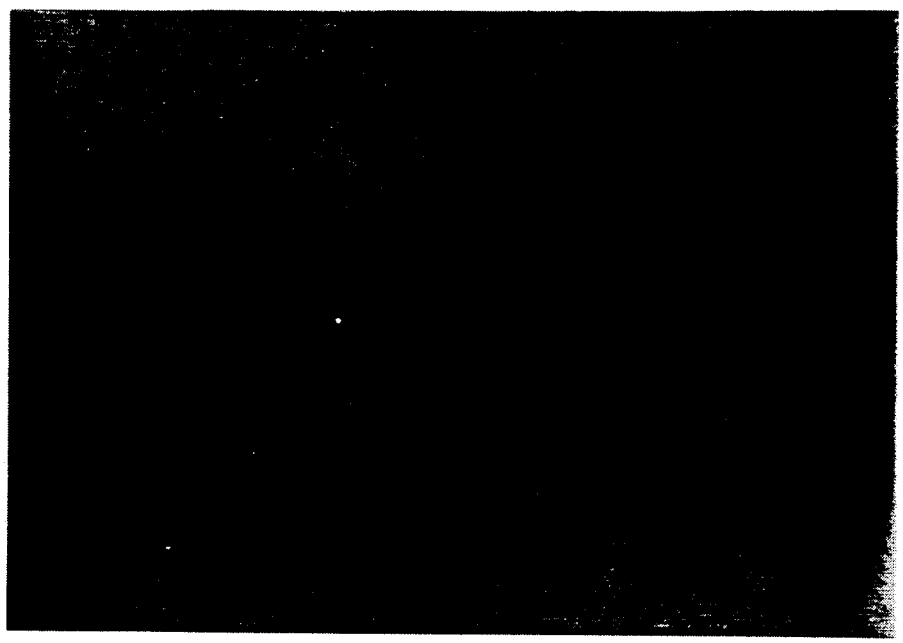
FIG. 3 shows a plan view of a surface, to be metallized, of a monofilm which serves as the comparative example for the monofilm of the invention as in FIG. 2.

FIG. 3 shows, as a comparison, the smoother surface of a polypropylene monofilm, which is likewise an 8 μm thick biaxially stretched polypropylene monofilm. However, in contrast to the illustrative embodiment of FIG. 2, the prefilm for this polypropylene monofilm is, during production, warmed to from 145° C. to 150° C. in the preheating zone before the longitudinal stretching. The prefilm remains at this temperature for about 6 seconds in the preheating zone. The temperature of the feed roll of the stretching zone is likewise 152° C., as in the illustrative embodiment of FIG. 2.

As can be seen from the drawing, fibrils and thus flaws which could serve as sources of oxidation processes after metallization of the smoother surface of the film do not form in the smoother surface of the polypropylene monofilm according to the invention. There are no significant differences in the other electrical and mechanical properties of the polypropylene monofilms of FIGS. 2 and 3.

For use as capacitor films, the films are metallized on the side having the smoother surface, the metals used preferably being aluminum, zinc, or mixtures of the two metals. The metal layer may be applied by any known process, and is generally applied to the upper side of the film by vapor deposition and generally has a thickness of from about 20 to about 50 nm, the thickness of the metal layer being adjusted in accordance with the desired resistance, which is generally in the order of from 1 to 5 Ω/m².

As an example, capacitors of 15 μF are wound from the metallized polypropylene monofilms and are located in an aluminum canister and are encapsulated with resin. The thickness of the polypropylene monofilm is 8 μm and the thickness of the metal layer is 25 nm. The capacitors produced in this way are measured for d.c. and a.c. voltage strength and for drop in capacity Δ C/C in percent.

The drop in capacity is measured by means of capacity measurements at 85° C. using a Schering capacity measuring bridge at an alternating voltage of 50 Hz. An alternating voltage of 500 V is applied to the capacitors for 2000 hours. The drop in capacity Δ C/C determined thereafter is −5%.

The d.c. and a.c. voltage strengths are in each case means taken from 21 ball-and-plate measurements, in which the film to be measured is laid on a plate as the first electrode and the second electrode is a ball in contact with the other side of the film. A direct voltage or an alternating voltage is applied to these two electrodes. An electrical breakdown of the 8 μm thick polypropylene monofilm takes place in the range between 750 and 800 V/μm during the measurement of the d.c. voltage strength and in a range of from 450 to 490 V/μm during the measurement of the a.c. voltage strength.

The polypropylene monofilm of the invention generally contains, as stabilizer, from about 0.1 to about 0.5 weight percent of a sterically hindered phenol. An example of a sterically hindered phenol of this type is Irganox 1010®, which is commercially available.

What is claimed is:

1. A biaxially stretched polypropylene monofilm which is substantially free of inorganic or organic lubricants and ionogenic constituents, consisting essentially of a homopolymer of propylene having an ash content of less than 50 ppm, having two surfaces, wherein the two surfaces have different roughnesses, wherein the smoother of the two surfaces is substantially free from fibrils and pits.

2. A polypropylene monofilm as claimed in claim 1, wherein the thickness of said monofilm is between 3 and 20 μm.

3. A polypropylene monofilm as claimed in claim 1, wherein the mean roughness $R_Z$ of the smoother surface is less than or equal to 0.25 μm and wherein the mean roughness $R_Z$ of the rougher surface is at least 0.02 μm higher, in each case measured at a cut-off value of 0.08 mm for the roughness measurement.

4. A polypropylene monofilm as claimed in claim 1, wherein the modulus of elasticity of the polypropylene monofilm is from 2200 to 3000 N/mm² in the longitudinal direction and from 4200 to 5200 N/mm² in the transverse direction.

5. A polypropylene monofilm as claimed in claim 1, which has an a.c. voltage strength of from 450 to 490 V/μm and a d.c. voltage strength of from 750 to 800 V/μm.

6. A polypropylene monofilm as claimed in claim 1, wherein from 0.1 to 0.5% by weight of the monofilm of a sterically hindered phenol has been added to the polypropylene monofilm as stabilizer.

7. A polypropylene monofilm as claimed in claim 1, wherein a metal layer to form a metallized film has been applied to the smoother surface of said film, said metal is selected from the group consisting of aluminum, zinc and mixtures thereof, and the thickness of said metal layer is between 20 and 50 nm.

8. A polypropylene monofilm as claimed in claim 7, wherein the drop in capacity Δ C/C of a capacitor made from the metallized film is at most −5% at 85° C. and an alternating voltage of 500 V at 50 Hz after 2000 hours, and a thickness of the polypropylene monofilm of 8 μm and a thickness of metal layer of 25 nm.

9. A polypropylene monofilm in the form of a metallized electrical insulation film for the production of capacitors comprising a metallized film as claimed in claim 7.

10. A polypropylene monofilm as claimed in claim 1, further comprising up to about 10% by weight of poly-4-methylpentene-1.

11. A polypropylene monofilm as claimed in claim 1, wherein the thickness of said monofilm is between about 4 to about 15 μm.

12. A polypropylene monofilm as claimed in claim 1, wherein the specific volume resistance at 23° C. is from about $1 \times 10^{18}$ to about $1 \times 10^{19}$ Ωcm.

13. A polypropylene monofilm as claimed in claim 7, wherein the metal layer is applied by vapor deposition.

14. A polypropylene monofilm as claimed in claim 7, wherein the metal layer comprises aluminum.

15. A capacitor which is wound from the polypropylene monofilm as claimed in claim 7.

16. A capacitor as claimed in claim 15, which is located in an aluminum canister and encapsulated with resin.

17. A polypropylene monofilm as claimed in claim 1, wherein both the rougher and the smoother surface consist essentially of α-spherulites.

18. A polypropylene monofilm as claimed in claim 17, wherein the rougher surface is produced by thermally converting β- to α-spherulites at a temperature of ≧ about 150° C.

19. A polypropylene monofilm as claimed in claim 17, wherein the smoother surface is produced by mechanically collapsing β-spherulites into α-spherulites at a temperature of below about 150° C.

20. A polypropylene monofilm as claimed in claim 18, wherein the temperature is between about 150° and 165° C.

21. A polypropylene monofilm as claimed in claim 19, wherein the temperature is between about 125° and 141° C.

* * * * *